United States Patent
Tian et al.

(10) Patent No.: US 12,372,679 B2
(45) Date of Patent: Jul. 29, 2025

(54) UTILITY POLE LOCALIZATION BY DISTRIBUTED FIBER SENSING OF AERIAL FIBER CABLE

(71) Applicant: NEC Laboratories America, Inc., Princeton, NJ (US)

(72) Inventors: Yue Tian, Princeton, NJ (US); Shaobo Han, Princeton, NJ (US); Sarper Ozharar, Princeton, NJ (US); Yangmin Ding, East Brunswick, NJ (US); You Lu, Blacksburg, VA (US)

(73) Assignee: NEC Corporation, Tokyo (JP)

( * ) Notice: Subject to any disclaimer, the term of this patent is extended or adjusted under 35 U.S.C. 154(b) by 609 days.

(21) Appl. No.: 17/504,365

(22) Filed: Oct. 18, 2021

(65) Prior Publication Data
US 2022/0120925 A1    Apr. 21, 2022

Related U.S. Application Data

(60) Provisional application No. 63/093,452, filed on Oct. 19, 2020.

(51) Int. Cl.
| | | |
|---|---|---|
| G01V 1/22 | (2006.01) | |
| G01D 5/353 | (2006.01) | |
| G01H 1/00 | (2006.01) | |
| G01H 9/00 | (2006.01) | |
| G01N 29/24 | (2006.01) | |
| G06N 3/04 | (2023.01) | |

(52) U.S. Cl.
CPC ......... *G01V 1/226* (2013.01); *G01D 5/35361* (2013.01); *G06N 3/04* (2013.01); *G01H 1/006* (2013.01); *G01H 9/00* (2013.01); *G01H 9/004* (2013.01); *G01N 29/2418* (2013.01); *G01N 2291/0423* (2013.01)

(58) Field of Classification Search
CPC .......... G01V 1/226; G01H 9/00; G01H 9/004; G01H 1/006; G01N 29/2418; G01N 2291/0423
USPC ........................................................... 73/655
See application file for complete search history.

(56) References Cited

U.S. PATENT DOCUMENTS

| | | | | |
|---|---|---|---|---|
| 11,366,231 B2 * | 6/2022 | Huang | .................... | G01V 1/001 |
| 2019/0236477 A1 * | 8/2019 | Huang | .................... | G08G 1/0116 |
| 2020/0003588 A1 * | 1/2020 | Huang | .................... | G06Q 50/40 |
| 2020/0124735 A1 * | 4/2020 | Huang | .................... | G01H 9/004 |
| 2021/0318166 A1 * | 10/2021 | Ding | .................... | G01H 9/004 |

(Continued)

FOREIGN PATENT DOCUMENTS

| | | | | |
|---|---|---|---|---|
| CN | 111679313 A | * | 9/2020 | |
| JP | 6974747 B2 | * | 12/2021 | ............. E02D 29/14 |

(Continued)

OTHER PUBLICATIONS

Written Opinion ISA PCT/US2021/055675, Utility pole localization by distributed fiber sensing of aerial fiber cable, Oct. 19, 2021, p. 4 (Year: 2021).*

(Continued)

*Primary Examiner* — Stephanie E Bloss
*Assistant Examiner* — Kevin C Butler
(74) *Attorney, Agent, or Firm* — Joseph Kolodka

(57) ABSTRACT

Aspects of the present disclosure describe the localization of a utility pole by distributed fiber sensing of aerial fiber cable suspended from the utility pole.

8 Claims, 4 Drawing Sheets

(56) References Cited

U.S. PATENT DOCUMENTS

| | | | | |
|---|---|---|---|---|
| 2021/0318504 | A1* | 10/2021 | Tian | G01H 9/004 |
| 2022/0120925 | A1* | 4/2022 | Tian | G01D 5/35361 |
| 2022/0236105 | A1* | 7/2022 | Ozharar | G01D 5/35361 |
| 2022/0316921 | A1* | 10/2022 | Huang | G01D 5/353 |
| 2022/0326070 | A1* | 10/2022 | Ding | G06N 20/20 |
| 2022/0326112 | A1* | 10/2022 | Tian | G01M 5/0091 |
| 2022/0329068 | A1* | 10/2022 | Ding | H02J 3/00125 |
| 2022/0334165 | A1* | 10/2022 | Ding | G01R 31/085 |
| 2023/0024104 | A1* | 1/2023 | Ding | G01R 31/62 |
| 2023/0029221 | A1* | 1/2023 | Ding | G01H 9/004 |
| 2023/0130862 | A1* | 4/2023 | Ozharar | G01N 23/203 |
| | | | | 73/643 |
| 2023/0152130 | A1* | 5/2023 | Huang | G01D 5/35358 |
| | | | | 73/655 |
| 2023/0152543 | A1* | 5/2023 | Han | G01H 9/004 |
| | | | | 385/100 |
| 2023/0179297 | A1* | 6/2023 | Ji | G01H 9/004 |
| | | | | 398/5 |
| 2023/0366703 | A1* | 11/2023 | Tian | G01D 5/35358 |
| 2023/0366725 | A1* | 11/2023 | Tian | G01H 9/004 |
| 2023/0375375 | A1* | 11/2023 | Ding | G06T 7/13 |
| 2023/0412266 | A1* | 12/2023 | White | G01D 5/35358 |
| 2024/0085238 | A1* | 3/2024 | Ding | G01H 9/004 |
| 2024/0125954 | A1* | 4/2024 | Jiang | G01V 1/226 |
| 2024/0184014 | A1* | 6/2024 | Mishima | G01H 9/004 |

FOREIGN PATENT DOCUMENTS

| | | | | |
|---|---|---|---|---|
| WO | WO-2021207102 A1 | * | 10/2021 | G01D 5/353 |
| WO | WO-2022087012 A1 | * | 4/2022 | G01D 5/35361 |
| WO | WO-2022159906 A1 | * | 7/2022 | G01D 5/353 |

OTHER PUBLICATIONS

International Search Report ISA PCT/US2021/055675, Utility pole localization by distributed fiber sensing of aerial fiber cable, Oct. 19, 2021, p. 3 (Year: 2021).*

* cited by examiner

UTILITY POLE LOCALIZATION BY DISTRIBUTED FIBER SENSING OF AERIAL FIBER CABLE

CROSS REFERENCE

This disclosure claims the benefit of U.S. Provisional Patent Application Ser. No. 63/093,452 filed Oct. 19, 2020 the entire contents of which is incorporated by reference as if set forth at length herein.

TECHNICAL FIELD

This disclosure relates generally to optical fiber communications. More particularly it pertains to location determination of utility poles suspending aerial fiber cable by distributed fiber sensing.

BACKGROUND

As is known in the art, optical fibers are widely used in contemporary telecommunications systems to guide optical signals in one or more glass cores comprising the fibers. Such fibers are oftentimes deployed as aerial fiber optic cables—suspended from utility poles—to provide communications services to both residential and commercial customers of telecommunications service providers.

To perform maintenance—for example, establishing new fiber branches, repairing damaged fiber cables, etc.—telecommunications service providers (carriers) oftentimes experience great difficulty in determining physical location(s) of such utility pole(s) and how far pole(s) are from a fiber optic cable point of origin as there is generally limited relationship between a geographic location(s) of pole(s) and fiber optic cable length due to extra cable loops/coils, etc., deployed for future drop points, branches, and redundancy.

SUMMARY

An advance in the art is made according to aspects of the present disclosure directed to a method providing utility pole localization by distributed fiber sensing of aerial fiber optic cable.

In sharp contrast to the prior art, the method according to aspects of the present disclosure determines utility pole locality by distributed acoustic sensing (DAS)/distributed vibration sensing (DVS), instant mechanical impact and a particular signal processing method.

Viewed from a first aspect, our inventive method employs a DAS/DVS interrogator optically connected to an end of an optical fiber cable, such that the DAS/DVS interrogator can detect vibrations experienced by the optical fiber cable, locations of the vibrations impacting that optical fiber cable and time of the vibrations. Operationally, our inventive method involves an instant mechanical impact (e.g. hammer knock) applied to a target pole supporting an aerial optical fiber cable, such that the aerial optical fiber cable experiences a vibration resulting from the mechanical impact and resulting vibration of the pole. Since the optical fiber cable is linear and extends in both directions from a point of fixation on the target pole, the resulting vibration signal(s) conveying DAS/DVS data first appears at the fixation point, and subsequently propagates along the optical fiber cable in both directions from that point in time. By determining an earliest vibrational location resulting from the instant mechanical impact, the fixing point of the optical fiber cable onto the pole can be localized, which of course is the pole's location along the optical fiber cable. The search process concludes with an inventive signal processing method combining edge detection and deep learning methods. Once the DAS/DVS interrogator is deployed to an optical fiber cable, all of the utility poles aerially supporting such optical fiber cable can be localized by our inventive system and method.

BRIEF DESCRIPTION OF THE DRAWING

A more complete understanding of the present disclosure may be realized by reference to the accompanying drawing in which.

Figure 1:
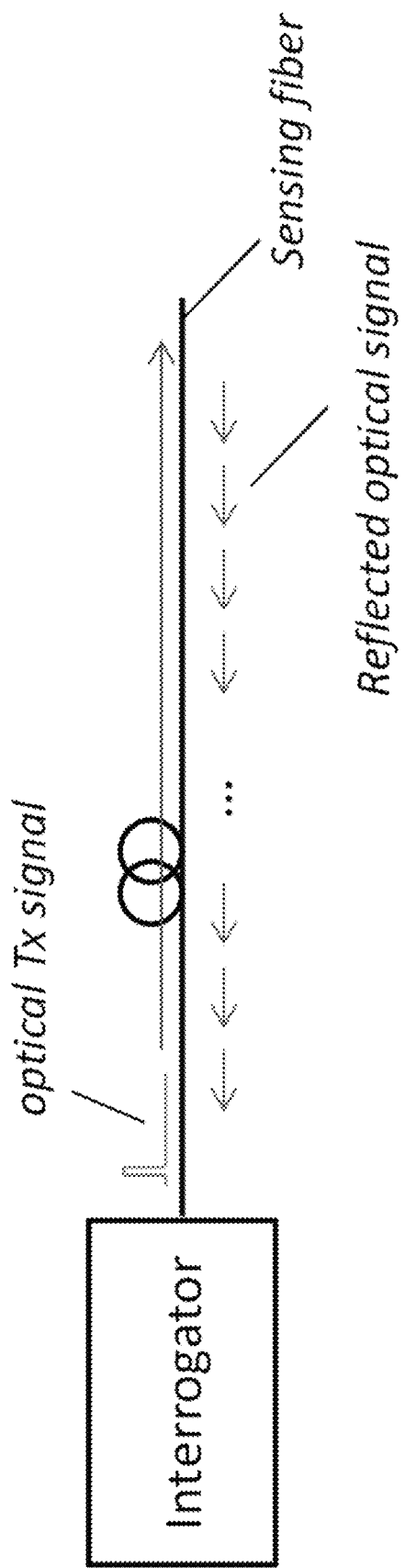
FIG. 1 is a schematic diagram of an illustrative distributed fiber optic sensing system and operation generally known in the art.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background—and with reference to FIG. 1 which is a schematic diagram of an illustrative distributed fiber optic sensing system generally known in the art—we begin by noting that distributed fiber optic sensing (DFOS) is an important and widely used technology to detect environmental conditions (such as temperature, vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator—and accompanying analysis structure/functions—that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber. As we shall show further—and according to aspects of the present disclosure—the interrogator may be in communication with further computing/data/storage resources including neural networks that may advantageously provide further detection/analysis capability to an overall DOFS system.

As we have noted previously, our inventive method—and systems—according to aspects of the present disclosure advantageously localize a location of a utility supporting an optical fiber cable through the effect of DAS and/or DVS technology further involving an instant mechanical impact on a pole and an inventive signal processing method.

Figure 2:
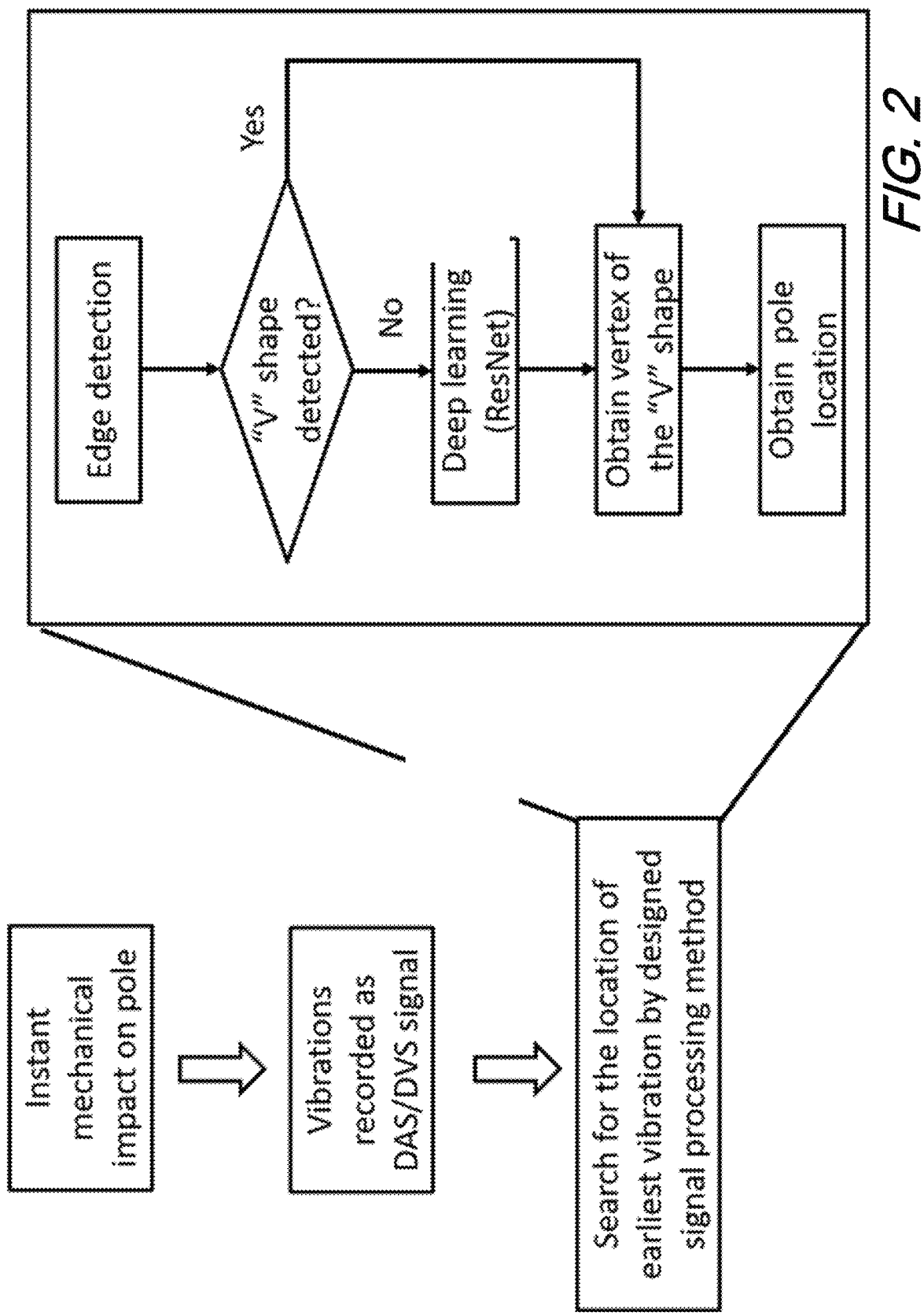
FIG. 2 is a flow diagram showing an illustrative method according to aspects of the present disclosure.

FIG. 2 is a flow diagram showing an illustrative method according to aspects of the present disclosure. With reference to that figure we note that to localize a target utility pole location along an optical fiber cable route, a DAS/DVS interrogator and system is provided at an end of the optical fiber cable and continuously monitors vibrations occurring along the length of the optical fiber cable. As will be readily understood and appreciated by those skilled in the art, the optical fiber cable may be an aerial cable wherein at least a portion of that cable is suspended through the effect of one or more utility poles. Additionally, through the effect of the DAS/DVS interrogator system, a location along the fiber at which mechanical vibrations are experienced may be determined by operation of the system.

According to aspects of the present disclosure, while the DAS/DVS interrogator is continuously interrogating the optical fiber cable, an instant mechanical impact—such as a hammer knock/impact—is made to one of the poles (target pole) that is suspending an aerial portion of the optical fiber cable. As those skilled in the art will understand and appreciate, while the DAS/DVS operation involves an optical fiber interrogation, we use the term optical fiber cable which may include multiple fibers, high tensile strength materials, and weatherproof cladding, or other elements. Accordingly, such operations described according to the present disclosure may employ the interrogation of a single optical fiber that is included as part of an optical fiber cable.

Continuing with our discussion of FIG. 2, as a result of the instant mechanical impact, mechanical vibrations are conducted from the impacted utility pole to the optical fiber cable that we noted is aerially suspended. The mechanical impact made to the pole may advantageously be applied from any direction, at any position of the utility pole so impacted.

As a result of the impact, mechanical vibrations are created in the optical fiber cable, which are subsequently detected, captured, recorded as a DAS/DVS signal by the continuously operating interrogator system. The data so recorded is further analyzed and processed employing an edge detection and deep learning methodology to determine an earliest vibration resulting from the instant mechanical impact. Advantageously, our signal processing method and techniques automate the determining process and achieve a fast, cost-effective, and objective determination without human intervention or expertise. Of further advantage, a single DAS/DVS interrogator may determine the location of all poles along an optical fiber route by this procedure.

As illustratively shown in the figure, the location of the earliest vibration involves an analysis if the signal data in which an edge is first detected. At that edge, a further analysis takes place in an attempt to locate a "v" shape or localized minima. If no such "v" shape is detected, a deep learning network (i.e., ResNet) may be employed to obtain a vertex of a "v" shape. From that vertex, the location of the pole to which the impact was applied is made.

Figure 3:
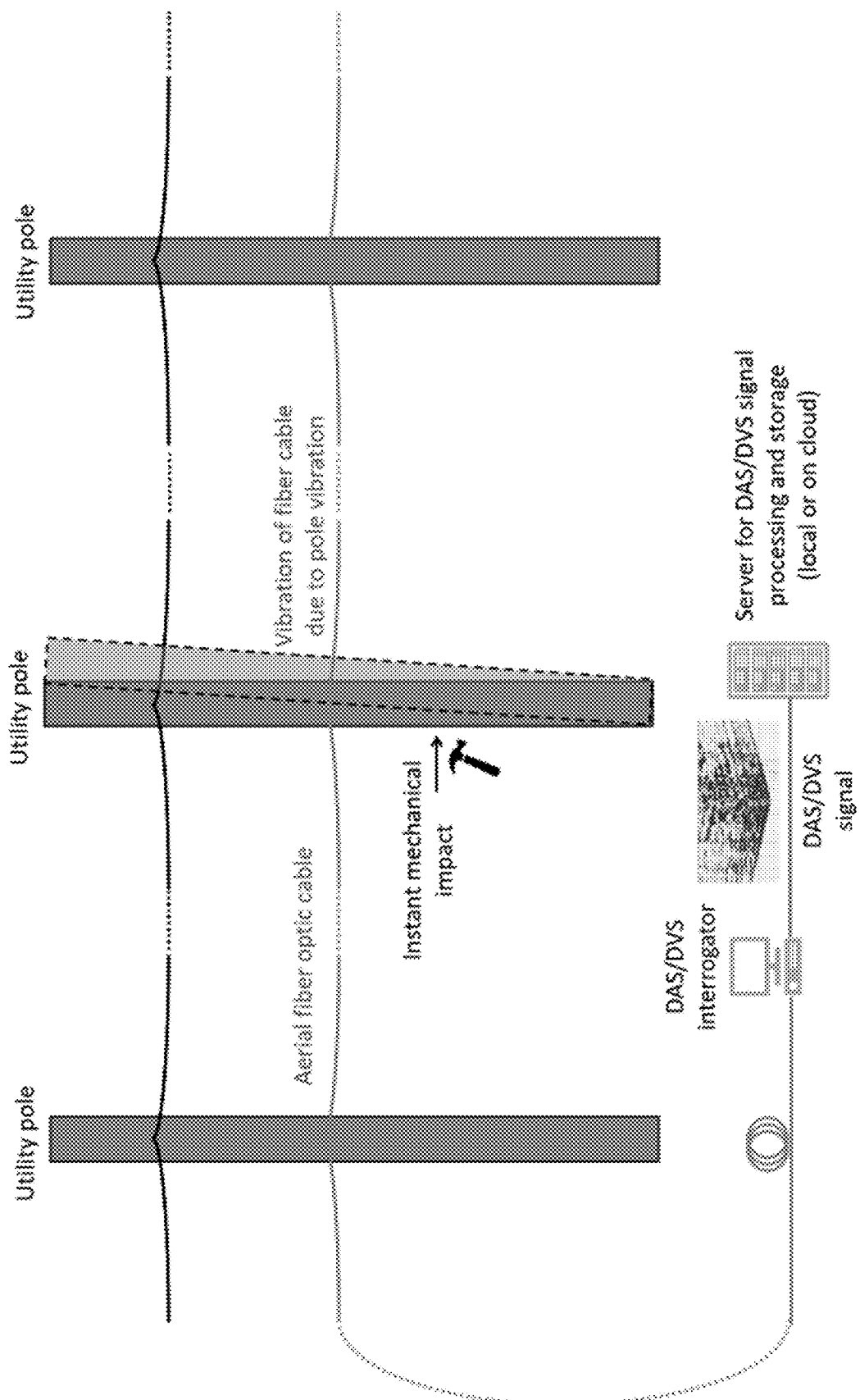
FIG. 3 is a schematic diagram showing an illustrative utility pole and aerial fiber optic cable including DAS/DVS interrogator and DAS/DVS signal processing and storage server according to aspects of the present disclosure.

FIG. 3 is a schematic diagram showing an illustrative utility pole and aerial fiber optic cable including the DAS/DVS interrogator and DAS/DVS signal processing and storage server according to aspects of the present disclosure. With the above discussion in mind and with reference to this figure, our inventive method according to the present disclosure may proceed as follows.

To an existing fiber optic cable suspended at least in part by utility poles, optically/mechanically connect a DAS/DVS interrogator to one end of the fiber optic cable and detect DAS/DVS signals resulting from mechanical vibrations experienced by the cable and record them as DAS/DVS signals.

Next, an instant mechanical impact, such as hammer knock, is applied onto a target pole at any position or direction as shown illustratively in FIG. 3. As a result, the pole is instantly vibrated, and as a result the aerial fiber cable suspended on the pole is vibrated as well.

The mechanical impact event is captured by DAS/DVS interrogator and recorded as DAS/DVS signal.

Figure 4:
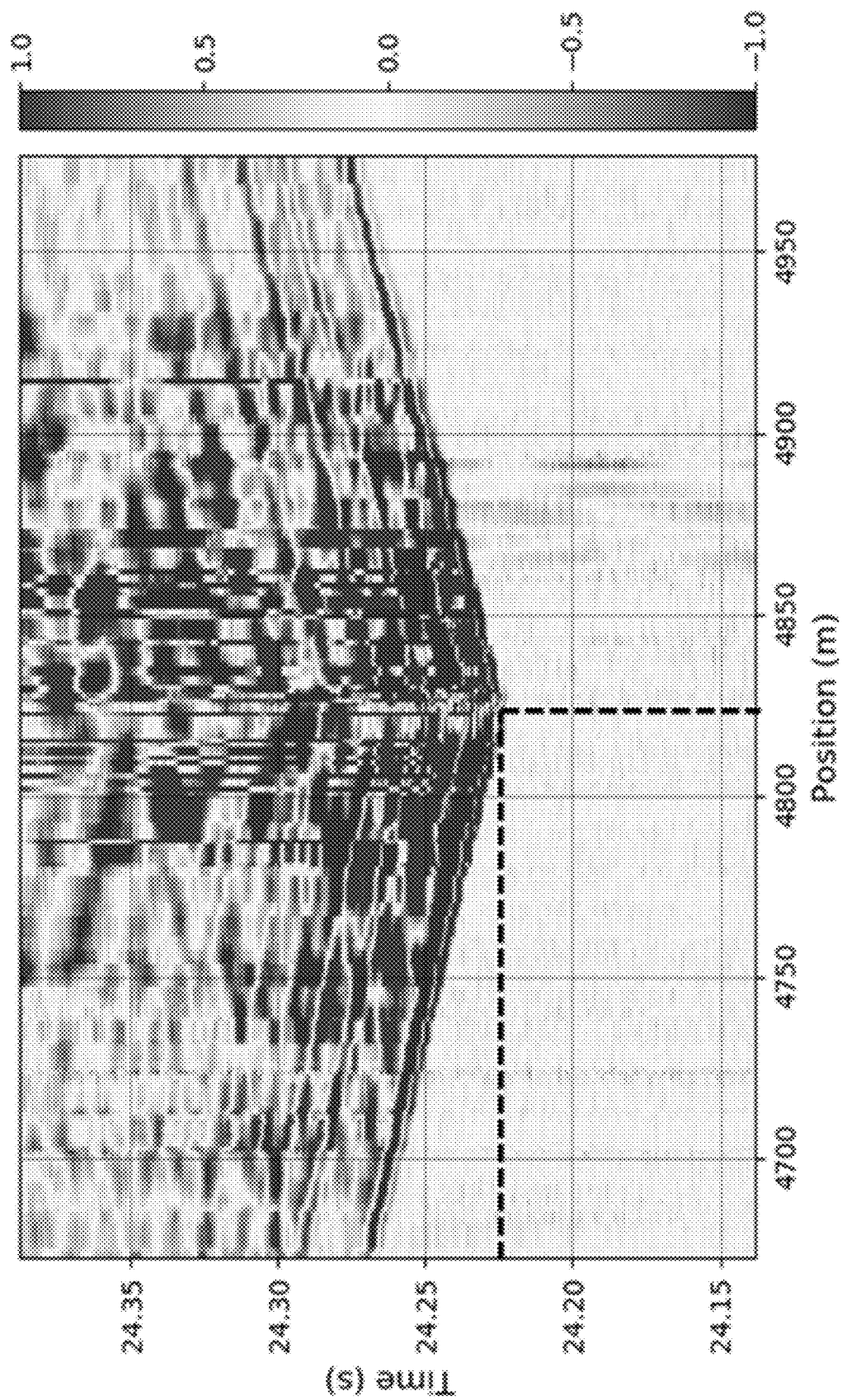
FIG. 4 is a plot showing a recorded DAS/DVS signal resulting from mechanical impact event as captured by a DAS/DVS interrogator according to aspects of the present disclosure.

FIG. 4 is a plot showing a recorded DAS/DVS signal resulting from mechanical impact event as captured by a DAS/DVS interrogator according to aspects of the present disclosure.

An exemplary DAS/DVS signal of a hammer knock on a pole is visualized as in FIG. 4. The x-axis represents the location of vibrations, while the y-axis shows the time of vibrations. The shadings of the signal imply the intensity of the vibrations as marked by the bar on the right of the plot. Thus, certain shaded areas represent the vibrations detected on corresponding locations (x coordinates) and times (y coordinates). From the shape of the vibration signal, it is apparently that the impact event happens at the bottom vertex (4825 m, 24.22 s, marked by dashed lines) of the "V" shape, since it is the earliest time point of any vibration.

To automate the search of the bottom vertex by computer, a novel signal processing method is applied on the DAS/DVS signal as indicated in FIG. 2.

Firstly, the DAS/DVS signal is processed by an edge detection method, for example a Canny edge detection. If a "V" shape signal is successfully detected from the vibration DAS/DVS signal by the edge detection method, the bottom vertex of the "V" shape can be determined (local minimum). If the edge detection method fails, a pre-trained deep learning method, e.g. ResNet, is employed to locate the vertex of a "V" shape in DAS/DVS signal. Since the vertex of the "V" shape is the earliest vibration, its location along the fiber cable is the target pole's location. Thus the target pole is successfully localized.

At this point, while we have presented this disclosure using some specific examples, those skilled in the art will recognize that our teachings are not so limited. Accordingly, this disclosure should be only limited by the scope of the claims attached hereto.

The invention claimed is:

1. A method for determining a location of a utility pole, the method comprising:
   receiving, from an aerial optical fiber suspended at least in part by the utility pole, an optical signal containing scattering effects resulting from an instant mechanical impact applied to the utility pole;
   identifying, based on the received optical signal containing the scattering effects resulting from the instant mechanical impact applied to the utility pole, a first vibration of the aerial optical fiber due to vibration of the utility pole resulting from the instant mechanical impact applied to the utility pole;
   analyzing, based on the identified first vibration, a location along the length of the optical fiber where the instant mechanical impact applied to the utility pole occurred; and
   determining, based on the location along the length of the optical fiber where the instant mechanical impact applied to the utility pole occurred, the location of the utility pole.

2. The method according to claim 1, wherein the received optical signal contains a time of vibrations.

3. The method according to claim 2, further comprising:
   plotting, based on the received optical signal, a time the instant mechanical impact applied to the utility pole occurred and a location where the instant mechanical impact occurred.

4. The method according to claim 1, wherein the identification of the first vibration is performed using edge detection and deep learning methodologies.

5. A system for determining a location of a utility pole, the system comprising:
   a non-transitory computer readable medium configured to store instructions thereon;
   a DFOS configured to receive from an aerial optical fiber suspended at least in part by the utility pole, an optical signal containing scattering effects resulting from an instant mechanical impact applied to the utility pole, wherein the DFOS connected to the aerial optical fiber;
   a processor connected to the DFOS and the non-transitory computer readable medium, wherein the processor is configured to execute the instructions for:
      identifying, based on the received optical signal containing the scattering effects resulting from the instant mechanical impact applied to the utility pole, a first vibration of the aerial optical fiber due to vibration of the utility pole resulting from the instant mechanical impact applied to the the utility pole;
      analyzing, based on the identified first vibration, a location along the length of the optical fiber where the instant mechanical impact applied to the utility pole occurred;
      determining, based on the location along the length of the optical fiber where the instant mechanical impact applied to the utility pole occurred, the location of the utility pole.

6. The system according to claim 5, wherein the received optical signal contains a time of the vibrations.

7. The system according to claim 6, wherein the processor is further configured to execute the instructions for:
   plotting, based on the received optical signal, a time the instant mechanical impact applied to the utility pole occurred and the location where the instant mechanical impact occurred.

8. The system according to claim 5, wherein the identification of the first vibration is performed using edge detection and deep learning methodologies.

* * * * *